March 29, 1927.  J. E. J. LANGUEPIN  1,622,792
MACHINE FOR ELECTRIC WELDING, SOLDERING, OR THE LIKE
Filed May 18, 1926  2 Sheets-Sheet 2
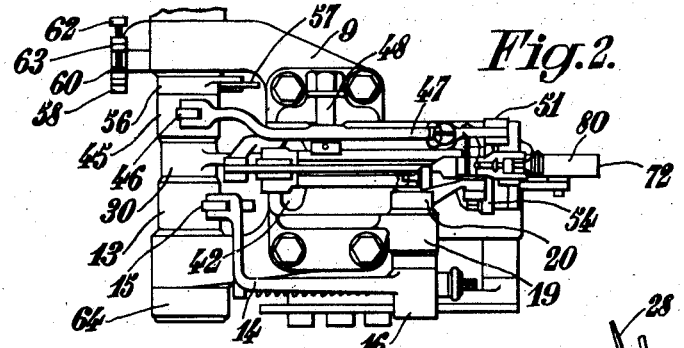
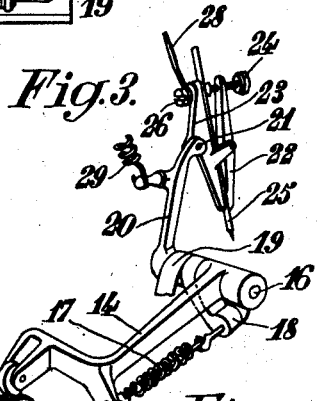
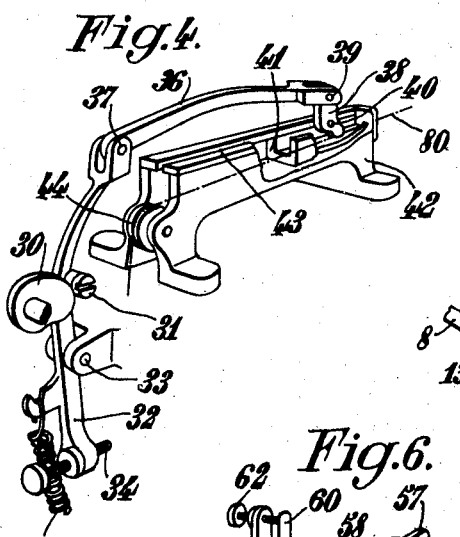
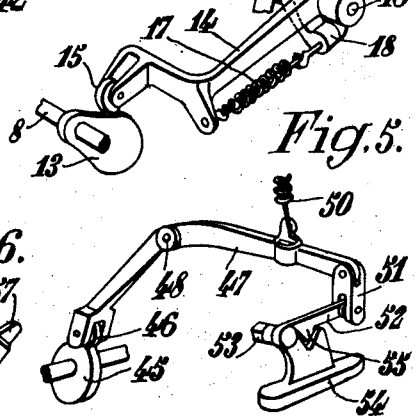
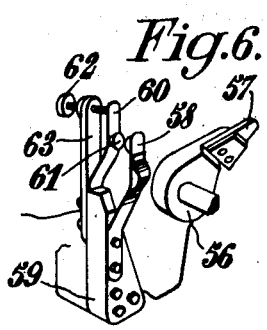
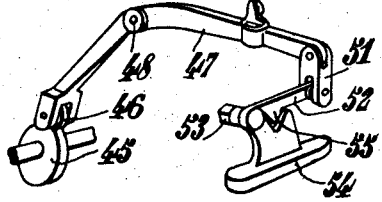
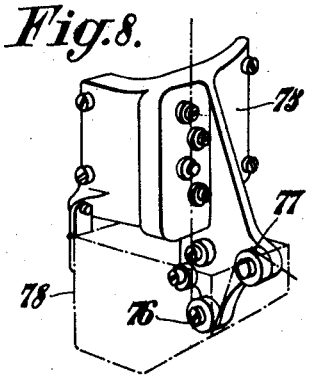
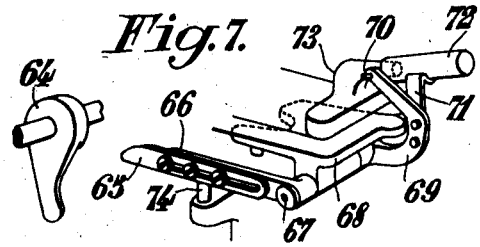
J. E. J. Languepin
Inventor
By: Marks & Clerk
Attys Patented Mar. 29, 1927.

1,622,792

UNITED STATES PATENT OFFICE.

JACQUES EMILE JULES LANGUEPIN, OF PARIS, FRANCE.

MACHINE FOR ELECTRIC WELDING, SOLDERING, OR THE LIKE.

Application filed May 18, 1926, Serial No. 109,967, and in France May 23, 1925.

The present invention relates to a machine for welding by electrical resistance, which is automatic and adapted for use in welding small parts.

In the form hereinafter described this machine is fitted up for welding a piece of wire or thin strip metal upon a tubular member.

It may thus be employed in this form, for instance for welding the connecting wires or strips upon the zincs employed in the construction of cells.

It may be employed, without changing its character, for the welding of any other similar part where the work to be done is of the same nature.

A special device is provided upon this machine for enabling the tin soldering to be carried out; it may also be employed for welding by resisting without the addition of metal for brazing.

The accompanying drawings illustrate by way of example a form of the machine according to the invention. In these drawings:

Figure 2 is a view from above, the upper part of the frame being assumed to have been removed.

Figures 3, 4, 5, 6, 7 and 8 are views showing separately each of the chief members or groups of members forming the machine.

Figure 1:
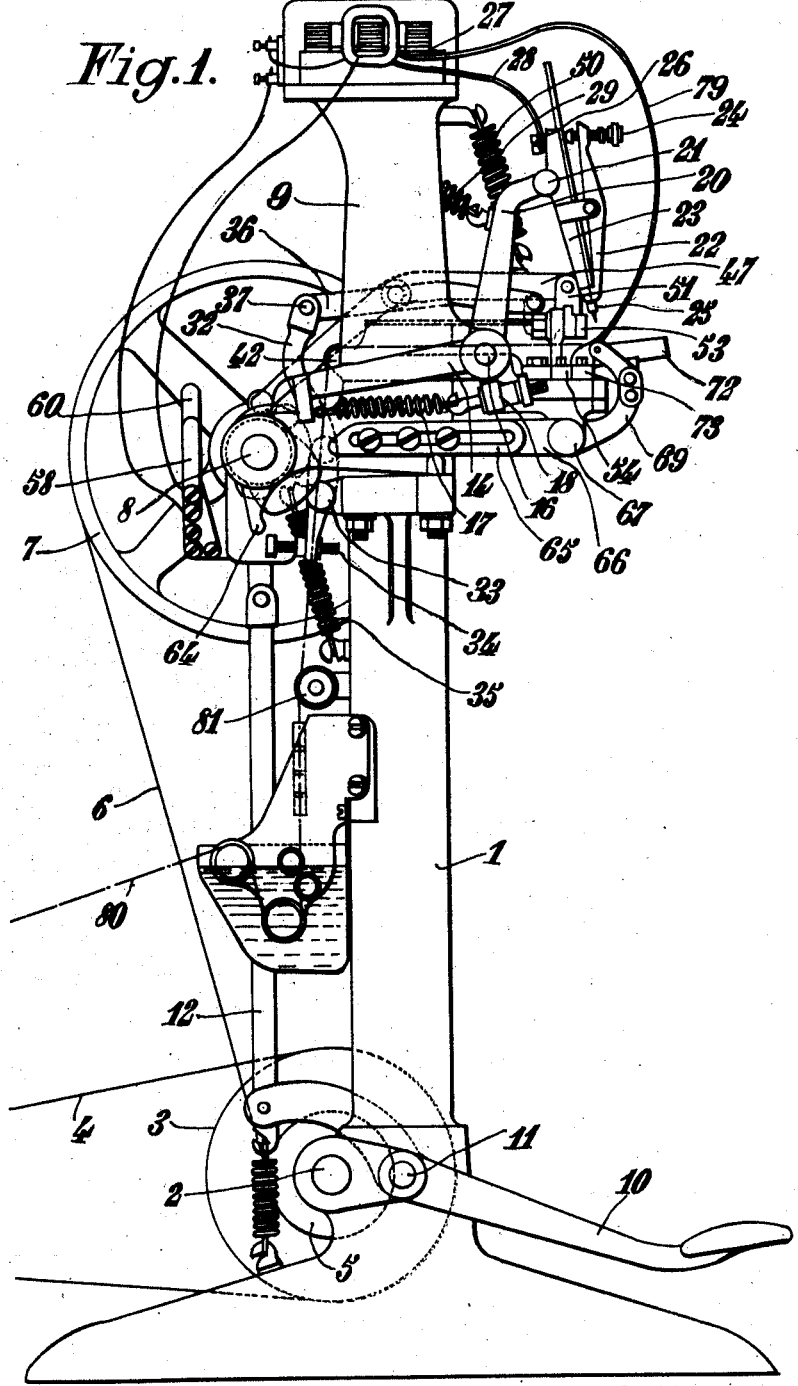
Figure 1 is a general arrangement view of the machine.

As shown in the drawings the machine is formed by a frame 1 provided with shaft 2 upon which is mounted a pulley 3 driven by a belt 4 which is driven by any suitable means. Upon the shaft 2 is also mounted a pulley 5 which drives, by means of a belt 6, a pulley 7 mounted upon a shaft 8 which is itself carried by a member 9 arranged upon the frame 1. The ratio between the pulleys 5 and 7 is chosen so as to give a speed of rotation of the shaft 2 such that the shaft 8 makes one turn for one complete welding or soldering operation.

The shaft 8 is provided with a series of cams which are seen in Figure 2 and which are shown separately or together with the members they control in Figures 3, 4, 5, 6 and 7.

The pulley 7 is connected to the shaft 8 by means of a key or dog clutch of any known type so that the shaft remains in engagement as long as a pressure is applied upon the pedal 10 which is pivotally mounted upon the pin 11, which controls this clutch operation through the rod 12 and always stops in the same predetermined position when the pedal is released.

As a large number of different types of clutches of this description are employed in the construction of automatic presses or machines any one of these arrangements may be fitted to the machine forming the subject of the present invention. The cam 13 (Figs. 2 and 3) fixed to the shaft 8 controls a lever 14 provided with a roller 15 and turning freely upon a pin 16.

The lever 14 is connected by an adjustable spring 17 to the member 18 keyed upon the pin 16. This pin turns freely in a bearing 19 provided upon the member 9. A lever 20 keyed to the shaft 16 carries an electrode holding claw mounted upon the said lever 20 by means of an insulated pin 21 allowing the inclination of the holder relatively to the lever to be varied.

This electrode holder is formed by a member 22 pivotally mounted upon a fixed member 23.

A screw 24 enables the welding or soldering electrode 25 to be gripped between these two members. This arrangement enables use to be made of a long electrode which can be moved dawn as it wears away.

A terminal 26 enables the secondary current supplied by the welding transformer 27 to he led to the holder by means of the flexible cable 28.

A spring 29 attached at one end to the lever 20 and at the other to the member 9 holds the electrode in a raised position as long as the cam 13 does not raise the lever 14 which produces, through the medium of the spring 17 and the member 18, the rotation of the pin 16 and consequently the lowering of the electrode. As the spring 17 is attached to the member 18 by means of a screw eye it is possible, by varying the pull upon the spring, to adjust the pressure which the electrode exerts upon the weld.

The cam 30 (Fig. 4) controls through the medium of a roller 31, a lever 32 pivotally mounted at 33 upon the member 9. This lever 32 is provided with a screw stop 34 which is made to rest against the member 1 under the action of the spring 35 attached at one end to 32 and at the other end to 1. A lever 36 pivotally mounted upon a pin 37 at the end of the lever 32 is pivotally connected at its other end to a member 38 by a pin 39.

The member 38 is adapted to turn about a pin 40 mounted upon a trough shaped member 41 which slides in a groove formed in a member 42 in which it is held by guide bars 43. The member 42 is attached to the member 9 (Figs. 1 and 2); it is provided with a pulley 44 for guiding the wire to be welded.

The cam 45 (Figs. 2 and 5) controls, through the medium of a roller 46 a lever 47 pivotally mounted at 48 upon the member 9. A spring 50 attached at one end to 47 and at the other to 9 keeps the roller 46 in contact with 45. A double strap 51 connects the lever 47 to a lever 52 pivotally connected at 53 to a member 54 attached to the member 9. The lever 52 is provided with a hardened steel knife 55 which is adapted to move so as to cut a metal strip or wire passing between the said knife and the member 54; this member is provided with a cutting part of hardened steel placed in a suitable position for the cut to be made correctly without occasioning wear of the parts. The form and the arrangement of these cutting parts may vary according to the dimensions of the wires or strips employed; they are not shown in detail. One of the pivotal joints of the member 51 is allowed sufficient play to allow the movement of the members to take place.

The cam 56 (Figs. 2 and 6) is provided with a tongue or strip of insulating material 57 which is adapted to move and push a blade spring 58 attached to a member 59 made of insulating material and carried by the member 9.

Another blade spring 60 attached to the member 59 is provided with a contact 61 against which is adapted to press the blade 58. A screw 62 provided upon a member 63 attached to 58 enables the distance between 58 and 60 to be regulated.

The primary circuit of the welding transformer passes through the point of contact of the blades 58 and 60 and consequently is only closed when the tongue 57 of the cam 56 has moved so as to push 58 againust 60.

The cam 64 (Figs. 1, 2 and 7) raises a member 65 attached by means of a slot and screws to a member 66 keyed upon a pivot 67.

The slots in the member 65 are adapted to enable the position of the member 67 to be varied and the length of the lever formed by the members 65 and 66 to be correspondingly varied in order to obtain a suitable period of contact with the cam 64. The shaft 67 is provided with a lever 69 upon which is mounted a pin 70 and a member 71 of suitable form adapted to support the member to be welded.

The part to be welded is shown at 72 in the form of a tube which rests upon 71. The electrode 73 attached to the member 9 moves, in this example, into the tube 72 upon which the weld is effected.

In Figure 7 it is seen that the tube 72 occupies a slightly inclined position so that it remains well in place during the welding operation, resting upon the electrode 73, the support 71 and the stud 70.

When the cam 64 raises the lever 65, the member 69 driven by the pivot 67 swings so as to make the welded member 72 fall and, as soon as the cam 64 releases the lever 65 the member 69 and the support 71 return into position in order to receive a new piece of work to be welded. An adjustable stop 74 controls the position of rest of the lever 65.

Figure 8 shows a positioning device provided with rollers 75, of the known type, which is mounted upon the member 1; it is provided with a set of return rollers 76 and 77 which pass the wire before straightening, into a casing 78 which may contain either a pickling substance or a paste containing the tin solder or the brazing medium according to the type of joint to be produced.

A cable 79 connects the secondary welding transformer to the electrode 73.

As mentioned above the drawings illustrate the case in which it is assumed that the machine is arranged for welding a metal wire upon a zinc tube for the construction of cells; this example of working will be chosen for describing the operation of the machine.

The wire 80 to be welded on is led from a coil and passes over rollers 77 and 76 and into the straightening apparatus 75; it then passes over a guide roller 81 mounted upon the member 1. From here the wire passes over the grooved roller 44, then into the groove in the member 41 between the latter and the member 38 and into the cutting apparatus between the members 54 and 55. The wire then passes over the member 72 to which it is to be joined. Actually when the member 72 is placed in position the wire stops to the right of the cutting apparatus which has just parted it off.

The member 72 having been placed in position, the pedal 10 is pressed down, which engages the shaft 8 upon the pulley 7. As a result of the rotation of the shaft 8 the cam 30 pushes the lever 32 which actuates the lever 36.

The member 38 driven by 36 turns about the pivot 40 and grips the wire 80 to be welded, between its lower part and the member 41.

As the rotation of 38 about 40 can no longer continue and as the lever 36 continues to be pushed, the member 41 slides in the slot provided in the member 42, carrying along the wire 80 the end of which is then placed upon the tube 72 to which it is to be welded.

During this movement the cam 13 has actuated the lever 14 which has caused the electrode 25 to be lowered, which electrode presses the wire 80 against the member 72. At this moment the cam 30 leaves the lever 31 which returns backwards under the action of the spring 35, also returning the lever 36. The member 38 pivots and disengages the wire 80 and the member 41 returns into its starting position. At the same time the tongue 57 provided upon the cam 56 has pushed the blade 58 in order to bring it into contact with 56, the effect of which is to close the primary circuit of the transformer and effect the welding; the current is cut off as soon as the tongue 57 of the cam 56 releases by its movement the cam 58; the cam 45 then raises the lever 47 which lowers the lever 52 and the knife 55 through the medium of the member 51, which causes the wire to be cut.

When the welding operation has been effected the cam 13 releases the lever 14 and the electrode 25 rises. The cam 64 then raises the lever 63 the effect of which is to make the member 69 swing about the pivot 67 and to make the member upon which the welding has been effected, fall.

If the pedal has been released the machine stops then as soon as the member 69 has returned into position and the machine is ready to receive a new part for the same cycle of operations to recommence. The cams may be chosen such that a certain period of time elapses between the return of the member 69 and the commencement of the second cycle; the machine may be employed by keeping the pedal lowered and by replacing the member during this period of rest.

What I claim is:

1. An automatic machine for electric welding, soldering and the like, for joining metal wire and the like to a member of any shape, said machine comprising a shaft rotating at a suitable speed such that one turn corresponds to one complete joining operation, cams on said shaft, a welding electrode, a welding transformer, an electrode holder, a claw on said electrode holder, an adjustable tension spring, a lever adapted to move said electrode holder through the action of said tension spring, said electrode holder claw being adapted to enable use to be made of a long electrode which is moved down as it wears away, said cams controlling the movements of said lever, means for gripping the wire and a cam and a set of levers for advancing the wire, a knife adapted to cut the wire to the desired length, said knife acting under the control of said cams, a switch connected in the primary of said transformer, said cams controlling said switch, a piece of work upon which the joint is to be made, a member holding said piece of work in place and adapted to let said piece of work fall at the completion of an operation.

2. An automatic machine for electric welding, soldering and the like, for joining metal wire and the like to a member of any shape, said machine being adapted to be employed for welding without the addition of metal, said machine comprising a shaft rotating at a suitable speed such that one turn corresponds to one complete joining operation, cams on said shaft, a welding electrode, a welding transformer, an electrode holder, a claw on said electrode holder, an adjustable tension spring, a lever adapted to move said electrode holder through the action of said tension spring, said electrode holder claw being adapted to enable use to be made of a long electrode which is moved down as it wears away, said cams controlling the movements of said lever, means for gripping the wire, and a cam and a set of levers for advancing the wire, a knife adapted to cut the wire to the desired length, said knife acting under the control of said cams, a switch connected in the primary of said transformer, said cams controlling said switch, a piece of work upon which the joint is to be made, a member holding said piece of work in place and adapted to let said piece of work fall at the completion of an operation.

In testimony whereof I have signed my name to this specification.

JACQUES EMILE JULES LANGUEPIN.